Figure 4:
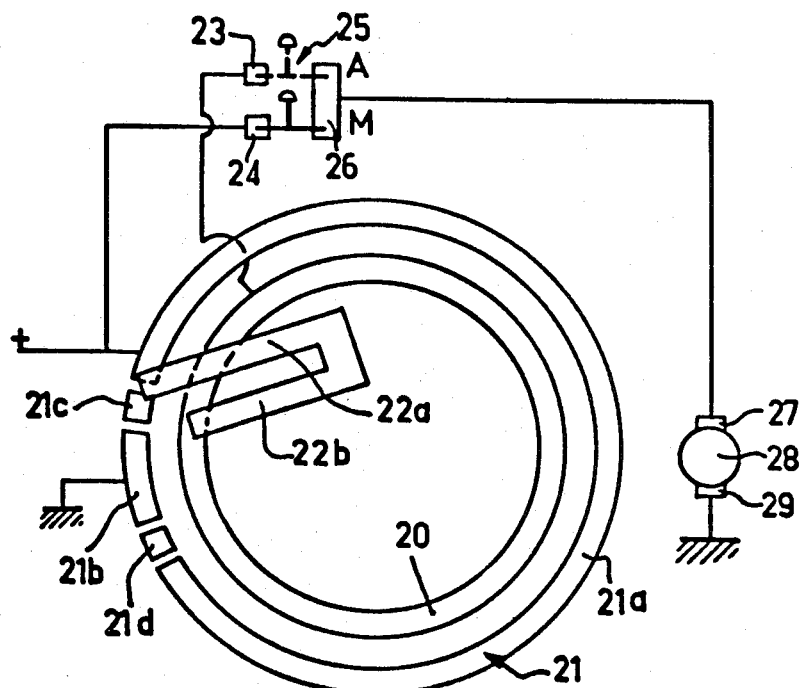

United States Patent [19]

Ecole

[11] Patent Number: 4,514,669
[45] Date of Patent: Apr. 30, 1985

[54] END OF TRAVEL STOP DEVICE FOR AN ELECTRIC MOTOR DRIVE MECHANISM

[75] Inventor: Auguste L. Ecole, Paris, France

[73] Assignee: Equipements Automobiles Marchal, Issy-Les-Moulineaux, France

[21] Appl. No.: 586,346

[22] Filed: Mar. 5, 1984

Related U.S. Application Data

[63] Continuation of Ser. No. 486,995, Apr. 21, 1983, abandoned, which is a continuation of Ser. No. 258,364, Apr. 28, 1981, abandoned.

[51] Int. Cl.³ .................................... H02P 1/04
[52] U.S. Cl. ........................... 318/443; 318/444
[58] Field of Search ............... 15/250.17; 200/11 G, 200/11 DA; 318/443, 444

[56] References Cited

U.S. PATENT DOCUMENTS 2,777,907  1/1957  Hooker .................. 200/11 G
3,030,460  4/1961  Huetten et al. ......... 200/11 DA
3,483,459  12/1969 Kearns .................. 318/444 X

FOREIGN PATENT DOCUMENTS 2428344  2/1980  France ................. 15/250.17

Primary Examiner—Ulysses Weldon
Attorney, Agent, or Firm—Brisebois & Kruger

[57] ABSTRACT

Contact wear and damage to circular tracks of an end of travel stop arrangement for electric windshield wipers is minimized by the configuration and orientation of the contact. The contact takes the form of a bent end of a contact arm which engages the track with an elongated end edge that extends at an angle greater than zero and less than 90° to the transverse or radial centerline of an insulating sector between ends of a conductive track. The so-angled contact edge slides easily over the junction between conducting and insulating sectors of the track.

12 Claims, 6 Drawing Figures

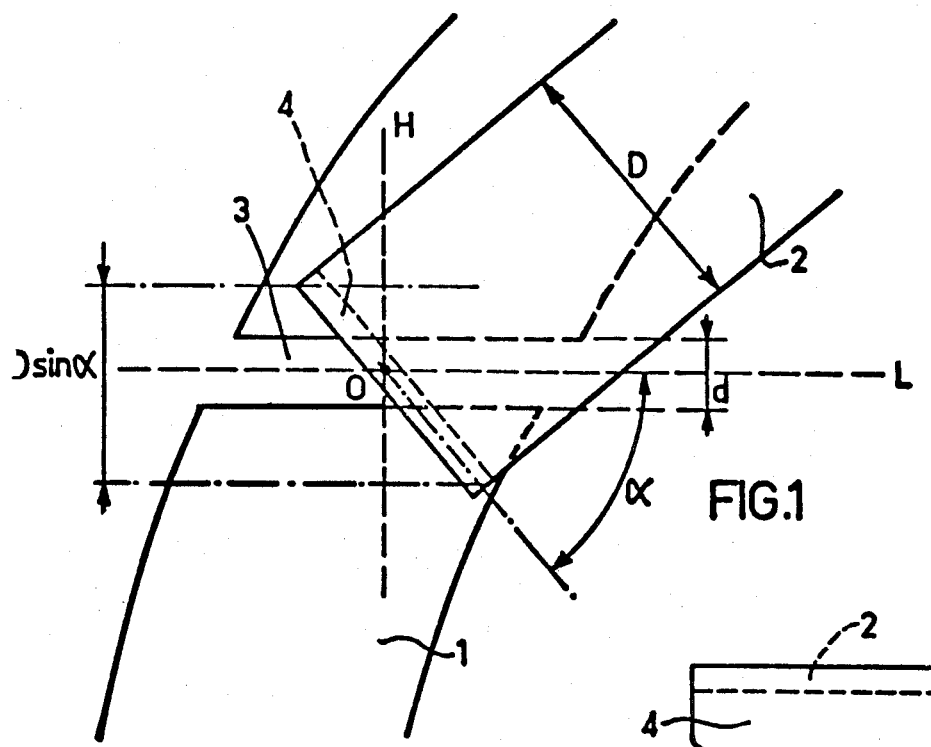
FIG.1
FIG.2
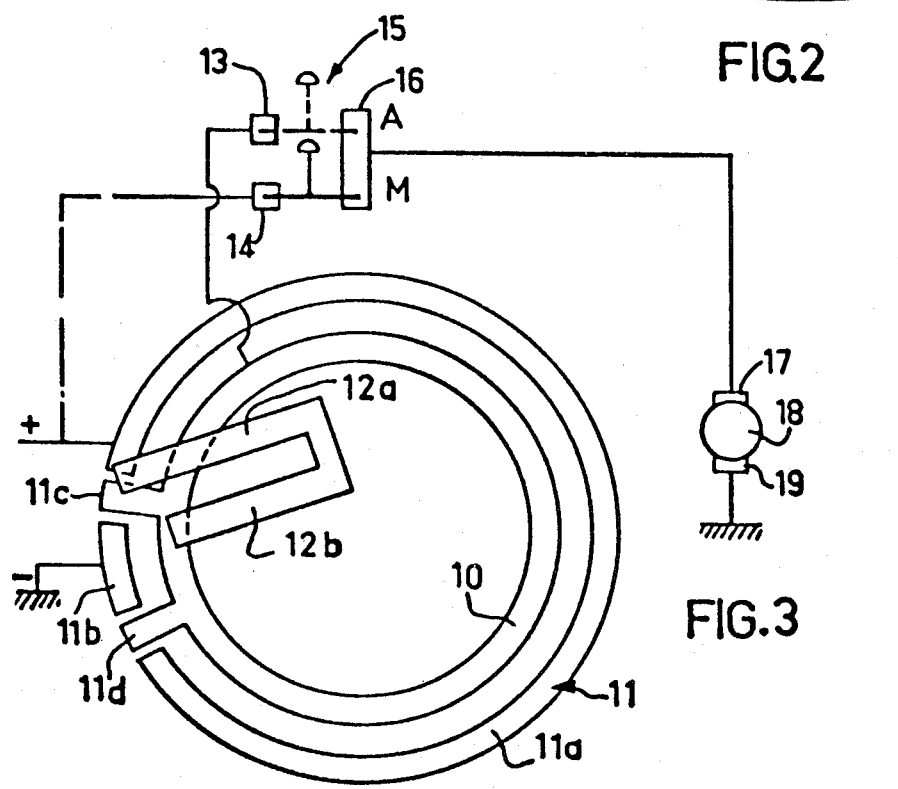
FIG.3

END OF TRAVEL STOP DEVICE FOR AN ELECTRIC MOTOR DRIVE MECHANISM

This is a continuation of application Ser. No. 486,995, filed Apr. 21, 1983, now abandoned; which was a continuation of Ser. No. 258,364 filed Apr. 28, 1981, now abandoned.

The present invention relates to an end of travel stop device for an electric motor drive mechanism, in particular for the drive of wind-screen wipers of a motor vehicle.

It is known that most of the windscreen wiper drive mechanisms of motor vehicles are fitted with end of travel stop devices allowing the wiper blade to be brought back into a predetermined rest position on the edge of the screen to be wiped. Most frequently, such a drive mechanism comprises an induction motor with a permanent magnet coupled to a speed reducer comprising a worm whose threads mesh with a cog wheel carried by a shaft which is at right angles to that of the worm. The reduction gear is accommodated in a sealed casing obturated by a lid arranged opposite the wheel of the reduction gear. In the French patent application No. 78-16854 filed on the June, 6, 1978, a device of this type has already been described, comprising a connector with two concentric circular tracks over each one of which, there may be displaced a contact arm; the cooperation of the contact arms and of the connector ensures either the supply for the motor or the short circuiting of the motor armature to produce a sudden stopping of the latter; the connector is fixed on the lid of a casing enclosing a wheel driven by the motor and accommodated in the said casing.

The contact arms generally used in the state of the art for this type of device are constituted by a strip whose end is provided with a contact pill which bears on the associated connector; this embodiment has the drawback of being expensive because the end pill must necessarily be attached to the strip which constitutes the contact arm. It has already been proposed in order to avoid these contact pills, to shape the end of the wiper arm so that it would have a convex part bearing on the connector; unfortunately, in the state of the art, these contact arms are associated with tracks comprising alternately conductor and insulating sectors and the friction on the electrically insulating sectors is frequently very abrasive so that the ends of the contact arms have a tendency towards relatively rapid wear; if the above mentioned wear is tolerable in the case of contact pills which comprise at their end a large quantity of material, it is not so in the case of contact amrs with a convex fold because the convex shape rubbing on the connector is subject to sufficiently rapid wear for cracks to be found at the end of the contact arms. When such a crack occurs, the portion of the contact arm which is released into the device, is liable to produce serious electrical disturbances and moreover, the end of the part of the contact arm which remains in existence does no longer necessarily ensure the correct electrical contact with the connector. It has already been proposed, for instance, in the French Pat. No. 2 236 262 to make contact arms by bending their ends perpendicularly to the connector so as to form a projection towards the said connector; the wear of the contact arm is then operative over the height of the projection which is considerably greater than the thickness of the strip whereof the contact arm is formed and one may therefore hope to improve the life of the contact arm in this way. Unfortunately, as is indicated in the present state of the art, when one has these contact arms disposed in such a way that the plane of the projections should be substantially perpendicular to the friction tracks on the connector, there do occur breakdowns in operation because of the fact that the projection catches on the edge of the metal conductor sectors of the connector each time the latter come into contact with the projection since there always exists a slight difference in level between a conductor sector of the connector and the electrically insulating sector which follows it. It will thus be seen that in the state of the art, the solution of contact arms with end pills is practically the only one to give technological satisfaction but as has been stated above, it has the drawback of increasing the cost price.

The object of the present invention is to propose an end of travel stop device comprising a connector and contact arms associated with the tracks of this connector, the said contact arms being made without an end pill and not having the drawbacks revealed by those previously proposed in the state of the art. The contact arms of the device according to the invention are contact arms whose end comprises a projection folded towards the connector but the drawbacks of this type of embodiment disappear if the projections of the contact arms are suitably arranged in relation to the tracks of the connector and more particularly in relation to the centre lines of the insulating sectors separating the conductor sectors of the same track. In fact, in the present state of the art, the projections are in a substantially parallel plane to the center line of the electrically insulating sectors of the connectors; if the plane of the projections becomes oblique in relation to the centre line, the projection, when coming into contact with the edge of an electrically conducting sector, rises gradually over this sector without catching on the edge and in this way, one avoids all the drawbacks exhibited by similar devices in the present state of the art. To improve the rise of the projection on the edge of a conductor sector, provision may, moreover, be made for forming a slight rounding on the lower edge of the projection. According to the invention, it has, moreover, been found that the life of the contact arms with projections could be considerably increased by preventing these contact arms from bearing during operation over an electrically insulating sector; to do this, it suffices for the electrically insulated sectors of each connector track to be sufficiently narrow in relation to the projection for the latter before leaving an electrically conducting sector to bear on the adjacent electrically conducting sector without practically coming into contact with the insulating sector separating the two adjacent conductor sectors; it is clear that in this case, the two adjacent conductor sectors of the same track are brought into electrical contact but for the electrical functioning not to be disturbed, it is sufficient that the two adjacent conductor sections should not be electrically connected to opposite poles of the supply. Thus it is possible to make an inexpensive fixed stop device having worthwhile technical operating characteristics as regards reliability and long life.

The object of the present invention is therefore a new industrial product constituted by an end of travel stop device for an electric motor drive mechanism, in particular for motor vehicle windscreen wipers, this device comprising several contact arms, each capable of displacement on one of the concentric circular tracks of a substantially plane connector, the relative motion of the contact arms and of the connector being produced by the rotation of the rotor of the said electric motor, the cooperation of the contact arms and of the connector ensuring, during the relative motion, either that the motor is supplied or not supplied, or that its armature is short-circuited by means of a track P of the connector comprising at least one electrically conducting sector and at least one electrically insulating sector, the contact arm associated with track P bearing on the said track by means of a projection constituted by the end of the said contact arm which is folded towards the connector, characterised in that opposite each insulating sector of track P, the centre plane of the projection of the corresponding contact arm forms an angle $\alpha$ which is not zero and not 90° with the centre line of the insulating sector.

In a preferred embodiment, if d is the maximum width of the insulating sectors of track P, measured perpendicularly to the centre line and D is the width of the projected projection over the plane of the connector, one ensures that one obtains $D \sin \alpha > d$; the end of the contact arm forming the projection is slightly rounded; the plane of the projection makes an angle comprised between 70 and 90 degrees with the plane of the connector; track P comprises at least one conductor sector connected to one pole of the power supply and at least one complementary conductor sector which is adjacent to the preceding one which is not connected to the supply.

Provision may be made for the connector to comprise two tracks, one of which has no insulating sector and is connected at the moment of the stop command to a terminal of the motor whilst the other has two conductor sectors connected respectively to both of the two poles of the power supply of the motor, the two contact arms of the device being electrically interconnected and the track which has two conductor sectors connected to the power supply, comprising moreover, two other complementary conductor sectors arranged between the two supplied sectors, the said track thus comprising four electrically insulating sectors. In a first variant of this embodiment, the two complementary sectors are electrically connected to the track which has no insulating sector; in a second variant, the two complementary sectors are electrically insulated.

Advantageously, the centre lines of the insulating sectors of the connector tracks are radial in relation to the tracks; the contact arms are fixed on a wheel driven by the rotor of the motor and the connector is in a fixed position; the wheel is arranged in a casing whose lid carries the connector, the two contact arms forming a single fork-shaped component carried by the said wheel.

To render the object of the invention more readily understood, there will be described below, two embodiments represented in the attached drawings by way of purely illustrative and non-restrictive examples.

Figure 5:
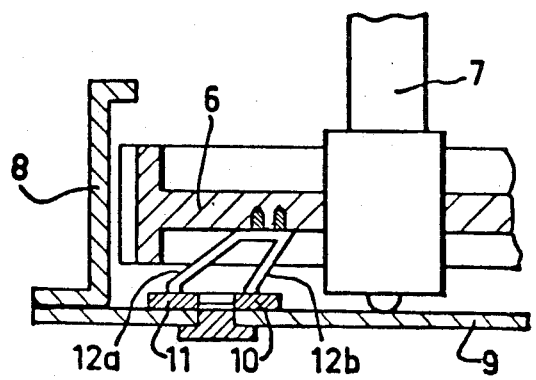
Figure 6:
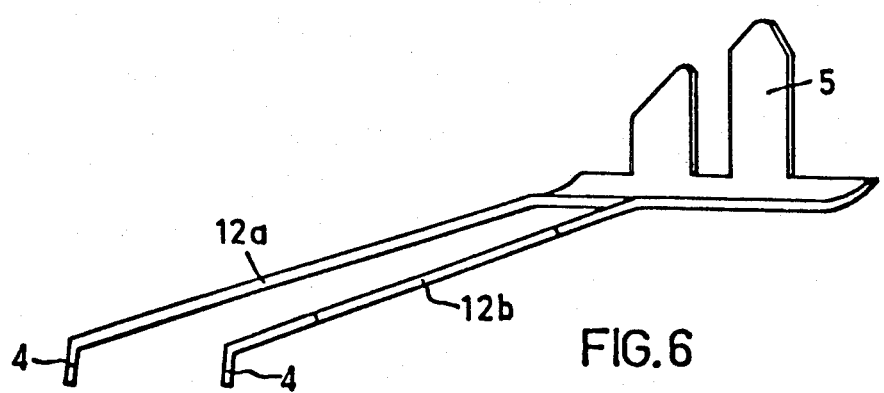

In these drawings:

FIG. 1 schematically represents the positioning of a projection of the contact arm in relation to the centre line of an electrically insulating sector of a connector track;

FIG. 2 shows an end view of the contact arm of FIG. 1;

FIG. 3 schematically shows the connector and contact arms of a fixed stop device according to the first variant of the invention;

FIG. 4 schematically shows the connector and the contact arms of a fixed stop device according to the second variant of the invention;

FIG. 5 schematically shows the cooperation of the contact arms and the connector of the device of FIG. 3 or FIG. 4 according to a part cross section passing through the motor axis;

FIG. 6 shows the contact arms of the embodiment of FIG. 5 in perspective.

Referring to FIG. 1, it will be seen that one has designated as 1, one of the tracks of a fixed stop device associated with a drive mechanism actuated by an electric motor. In a known way, such a fixed stop device comprises a substantially plane connector having several circular concentric tracks, a contact arm bearing on each track of the connector. In FIG. 1, the contact arm has been designated by 2. Track 1 comprises two conductor sectors which are separated by an electrically insulating sector 3. The electrically insulating sector 3 is delimited by two parallel edges and its centre line has been designated by OL. Point 0 is substantially in the middle of the insulating sector, that is to say, half way from the two edges delimiting track 1. Contact arm 2 is formed by a metal strip whose end has been bent at right angles to form a projection 4. The shape of projection 4 has been shown in detail in FIG. 2: it will be seen that projection 4 has rounded corners and that its bottom edge coming into contact with track 1 is slightly domed with a very large radius of curvature. The plane of projection 4 is substantially perpendicular to the plane of track 1 and it forms with the line OL an angle $\alpha$ which is not zero and not equal to 90°: in the Figure, angle $\alpha$ approximates 45°. By OH one has designated the perpendicular at 0 to line OL. In the layout of FIG. 1, the projected projection on line OH has the value of $D \sin \alpha$, if D denotes the width of the strip forming the contact arm. It is clear in the Figure that $D \sin \alpha$ is greater than d, that is to say, than the width of the electrically conducting sector measured perpendicularly to the centre line.

In FIG. 3, there has been shown schematically a connector and its associated contact arms for the implementation of the first variant of the invention. The connector is formed by two circular concentric tracks 10 and 11. Track 10 is formed by a continuous electric conductor sector. Track 11 is formed by a conductor sector 11a connected to the positive lead and a conductor sector 11b connected with the negative lead, these two sectors being separated from each other by two complementary sectors 11c, 11d which are mechanically and electrically connected to track 10. Between the conductor sectors 11a, 11b, 11c, 11d, there have been arranged electrically insulating sectors which are directed radially in relation to track 11.

The two contact arms 12a, 12b form one and the same component made from a cut and bent metal sheet. The projections forming the end of the contact arms 12a and 12b make an angle of 84° with the plane of the connector. The orientation of contact arm 12a is such that the plane of the end projection forms an angle $\alpha$ of approximately 60° with the axis of the insulating sectors of track 11 when these sectors come to be opposite the projection.

Track 10 is connected to terminal 13 of a manual switch 15 whose second input terminal 14 is connected to the positive lead. The output 16 of the manual switch 15 is connected to terminal 17 of a motor 18 whose other terminal 19 is connected to the earth. The movable element of switch 15 is represented in dotted lines for the stop position and in solid lines for the operating position. If switch 15 is placed in its operating position, the motor is supplied directly by terminal 14 of the switch; the rotor of the motor therefore drives contact arms 12a, 12b in relation to connector (10, 11). If switch 15 is placed into the stop position, the power supply of the motor is effected by terminal 13 while the contact arms 12a, 12b connect the sector 11a and track 10. When contact arm 12a arrives on sector 11c, the contact arms 12a, 12b no longer have any electrical function because the two projections bear on elements 10 and 11c which form part of the same conductor element; the motor is no longer supplied but continues to turn by inertia and contact arm 12a then arrives on sector 11b which connects the two terminals of the motor to earth and arrests the motor in this position. The restarting may only be effected by acting on switch 15.

In this embodiment, the contact arms 12a and 12b do not comprise any end pill but only projections obtained by bending a metal sheet. The detailed profile of contact arms 12a, 12b is shown in FIG. 6. These contact arms which comprise projections 4 at each end, are fixed by teeth 5 on a wheel 6 as may be clearly seen in FIG. 5. In this Figure, it will be seen that wheel 6 is driven by shaft 7 of the motor of the drive mechanism of which the fixed stop device described forms a part; wheel 6 is arranged in a casing 8 whose lid 9 carries the connector formed by tracks 10 and 11.

It will be found that during operation, there do not occur any breakdowns although the ends of the contact arms 12a, 12b are not provided with pills. The end projections do not catch on the edges of the conductor sectors since, in the case of contact arm 12b, the track is continuous and since for contact arm 12a, the width of the projection measured perpendicularly to the centre line of the insulating sector is greater than the width of the said insulating sector; it follows therefrom, in fact that projection 4 of contact arm 12a never chafes on an electric insulator because it passes from one metal sector to another metal sector in view of the small width of the electrically insulating sectors which separate the conductor sectors of track 11. This fixed stop device has a long life and great reliability.

In FIG. 4, there has been shown a variant of the embodiment of the device shown in FIG. 3. The only difference existing between the connectors of FIGS. 3 and 4 is due to the fact that the complementary conductors 11c, 11d of track 11 are no longer connected mechanically and electrically to track 10 but are electrically insulated. In FIG. 4, the elements corresponding to those of FIG. 3 have been designated by the same reference numbers increased by 10. The elements appearing in FIG. 4 will therefore not be described in detail because they are, as a whole, identical with those of FIG. 3. The complementary conductor sectors of track 21 are the sectors 21c, 21d which are insulated electrically. The functioning of this device is strictly identical with that which has been described for the device of FIG. 3.

It shall be duly understood that the embodiments described above are in no way restrictive and may give rise to any desirable modifications without thereby departing from the scope of the invention.

I claim:

1. An end of travel stop device for a mechanism driven by an electric motor, particularly for windscreen wipers of motor vehicles, said device comprising: a connector having a plurality of circular concentric tracks, a plurality of contact arms displaceable respectively along said tracks, means for moving said contact arms and said connector relative to each other in response to rotation of the electric motor, said contact arms and connector cooperating to control energization of the motor, de-energization of the motor, or short circuiting of the armature of the motor, during said relative rotation, at least one of said tracks of the connector defining a plane and comprising at least one substantially flat electrically conducting sector and at least one insulated sector substantially coplanar with and adjacent to said electrically conducting sector, the contact arm associated with said at least one track having an elongated contact end comprised of an end of the contact arm projecting toward and engaging said track with an elongated end edge thereof, said at least one insulated sector having a center line extending transversely across said at least one track and lying in a plane of the track, said elongated contact end defining a plane, and said end edge of said contact forming an angle α with said center line of the insulated sector which is between 45° and 60°.

2. Device according to claim 1, wherein said at least one of said tracks comprises a plurality of insulating sectors, and each insulating sector of said track has a maximum width, measured perpendicularly to said center line of said insulating sector which is less than the length of the end edge of the contact engaging the connector, multiplied by sine of the angle α.

3. Device according to claim 1, wherein each end of the elongated end edge of the contact is slightly rounded.

4. Device according to claim 1 wherein said at least one track comprises a first track with at least one conductor sector connected to one pole of a power supply of the motor, and at least one complementary conductor sector which is adjacent the at least one conductor sector, and not connected to the power supply, said conductor sector and said complementary conductor sector being separated by an insulating sector.

5. Device according to claim 4 wherein the connector further comprises a second track, the second track being devoid of an insulating sector and being connected, at the time of a motor stop command, to a terminal of the motor, said first track has first and second conductor sectors connected respectively to the two poles of the power supply of the motor, said plurality of contact arms comprises two electrically connected contact arms, each having an end edge engaging its track, and said first track further comprises two complementary conductor sectors between ends of said first and second conductor sectors, each complementary conductor sector of said second track being separated from an adjacent conductor sector of the first track by an insulating sector.

6. Device according to claim 5, wherein said second track comprises a continuous conductor devoid of insulating sectors, and said two complementary sectors comprise conductive sectors electrically connected to said continuous conductor.

7. Device according to claim 5, wherein the two complementary sectors are each electrically insulated from said second track.

8. Device according to claim 1, wherein the center line of said at least one insulating sector extends radially of the tracks.

9. Device according to claim 1, wherein said contact arms are fixed to a wheel driven by a rotor of the motor, and said connector comprises a stationary connector.

10. Device according to claim 9, wherein said wheel is within a casing having a cover, said cover carries said connector, and said contact arms comprise arms of a single fork shaped component attached to said wheel.

11. An end of travel stop device for a mechanism driven by an electric motor, particularly for windscreen wipers of motor vehicles, said device comprising: a connector having at least one circular track, a contact arm displaceable along said track, means for moving said contact arm and said connector relative to each other in response to rotation of the electric motor, said contact arm and connector cooperating to control energization of and de-energization of the motor, during said relative rotation, said track of the connector defining a plane and comprising at least one substantially flat electrically conducting sector having first and second ends extending transversely of the track, and at least one insulated sector substantially coplanar with and between said ends of said electrically conducting sector, said contact arm displaceable along said at least one track having an elongated contact end comprised of an end of the contact arm bent to project toward said track and engaging said track with an elongated end edge thereof, said elongated end edge engaging said first end of said conductive sector along a line forming an angle with said first end, which is greater than zero and less than 90°, and engaging said second end of said conductor along a line forming an angle with said second end which is greater than zero and less than 90°.

12. An end of travel stop according to claim 11 wherein said angles are each between 45° and 60°.

* * * * *